United States Patent [19]

Bloch

[11] Patent Number: 4,880,447

[45] Date of Patent: Nov. 14, 1989

[54] METHOD AND APPARATUS FOR STEAM FLOW VENTING INCORPORATING AIR EDUCTING MEANS

[75] Inventor: Christopher J. Bloch, Kingwood, Tex.

[73] Assignee: Naylor Industrial Services, Inc., Pasadena, Tex.

[21] Appl. No.: 275,229

[22] Filed: Nov. 22, 1988

[51] Int. Cl.⁴ .................... B01D 19/00; B01D 47/06

[52] U.S. Cl. .................... 55/94; 55/186; 55/193; 55/237; 261/16; 261/116; 261/DIG. 13; 261/DIG. 76

[58] Field of Search .................... 55/185, 186, 193, 204, 55/207, 235, 237, 15, 18, 1, 83, 84, 94, 93; 261/16, 76, 115, 116, DIG. 13, DIG. 76; 134/22.12, 22.15, 22.18, 30, 31, 104, 109–111, 166 C, 167 C, 171

[56] References Cited

U.S. PATENT DOCUMENTS

| | | | |
|---|---|---|---|
| 580,169 | 4/1897 | Washington | 55/193 |
| 1,211,691 | 1/1917 | Eisendrath | 261/DIG. 76 |
| 1,639,179 | 8/1927 | Hamel | 261/116 X |
| 1,832,652 | 11/1931 | Peebles | 261/DIG. 13 |
| 2,183,561 | 12/1939 | Hamblin | 261/76 |
| 2,364,199 | 12/1944 | Derr | 261/76 X |
| 2,421,761 | 6/1947 | Rowand et al. | 261/116 |
| 2,477,204 | 7/1949 | Ravine | 261/116 |
| 2,604,185 | 7/1952 | Johnstone et al. | 55/237 X |
| 2,732,192 | 1/1956 | Johnson et al. | 261/116 X |
| 2,899,971 | 8/1959 | Munter | 261/76 X |
| 3,219,323 | 11/1965 | Spence | 261/DIG. 13 |
| 3,490,204 | 1/1970 | Kalika | 261/116 X |
| 3,498,028 | 3/1970 | Trouw | 261/116 X |
| 3,689,237 | 9/1972 | Stark et al. | 261/16 X |
| 3,719,524 | 3/1973 | Ripley et al. | 261/DIG. 13 |
| 3,912,469 | 10/1975 | Ewan et al. | 261/DIG. 76 |
| 4,068,802 | 1/1978 | Goings | 261/116 X |
| 4,083,932 | 4/1978 | Muraco et al. | 261/116 X |
| 4,130,611 | 12/1978 | Brand | 261/DIG. 13 |
| 4,141,701 | 2/1979 | Ewan et al. | 261/DIG. 76 |
| 4,442,047 | 4/1984 | Johnson | 261/DIG. 13 |

FOREIGN PATENT DOCUMENTS

| | | | |
|---|---|---|---|
| 2620855 | 12/1977 | Fed. Rep. of Germany | 55/235 |

*Primary Examiner*—Robert Spitzer

*Attorney, Agent, or Firm*—Gunn, Lee & Miller

[57] ABSTRACT

The present disclosure sets forth a method and apparatus for adjusting the rate at which water is introduced as a cooling and decelerating fluid in mist form into a discharge vent for high velocity superheated steam. An optimum measure of water is determined so that the steam is decelerated to a velocity not lower than about 35% of sonic velocity. Moreover, air is educted into the steam flow to further enhance the cooling and deceleration of the steam which is then vented. By the introduction of air and water mist, the steam is cooled and decelerated, thereby avoiding formation of a sonic wave creating unwanted backpressure and avoiding creation of noise.

21 Claims, 3 Drawing Sheets

FIG. 1
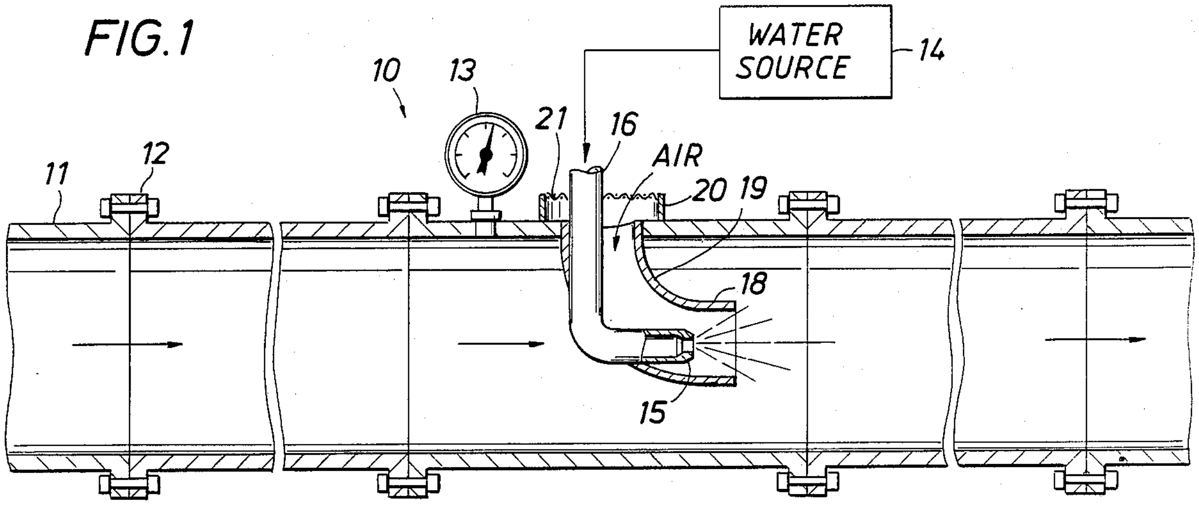
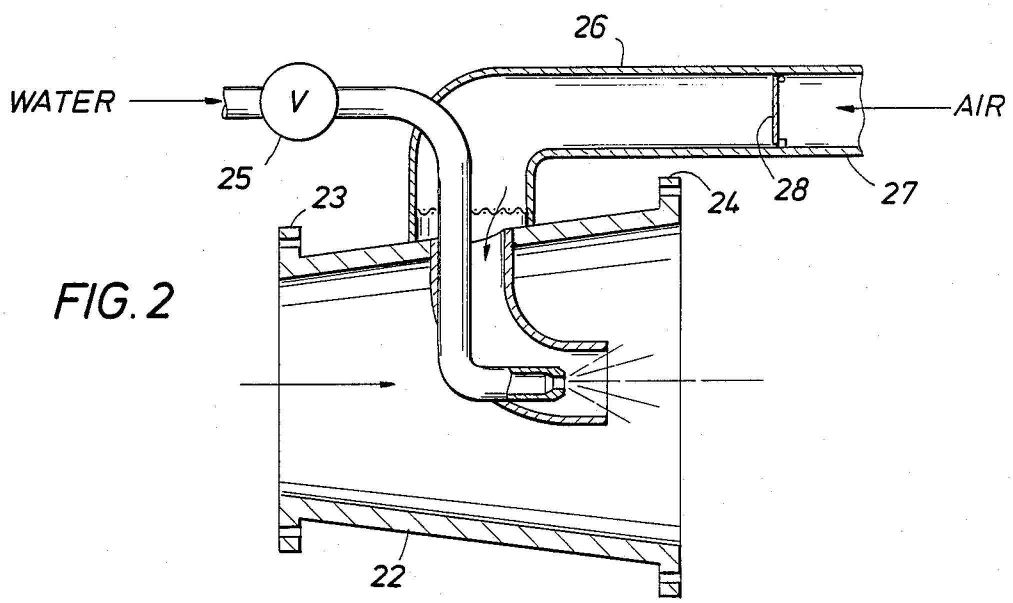
FIG. 2
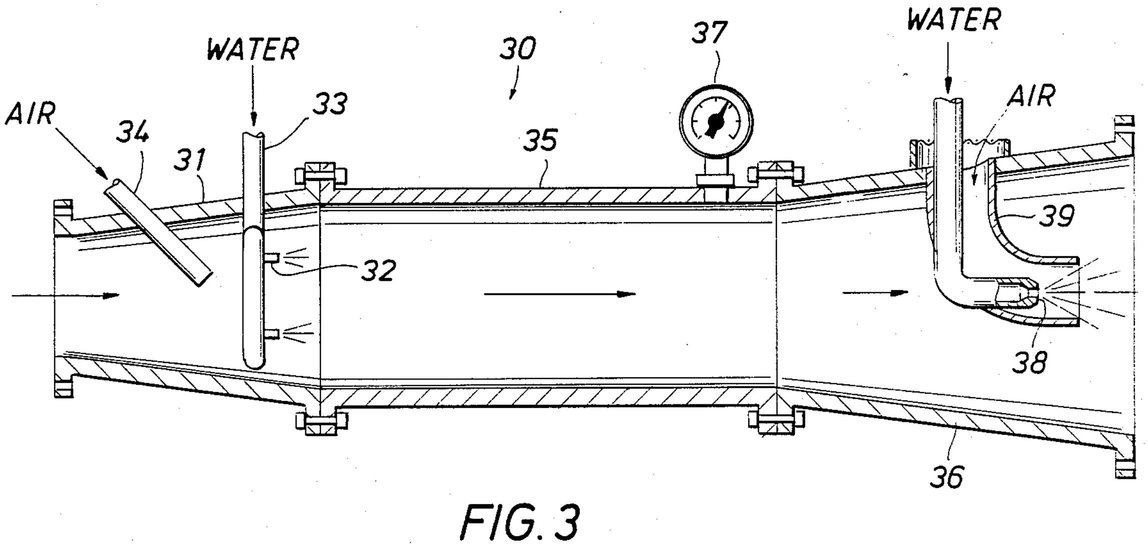
FIG. 3

FIG. 7
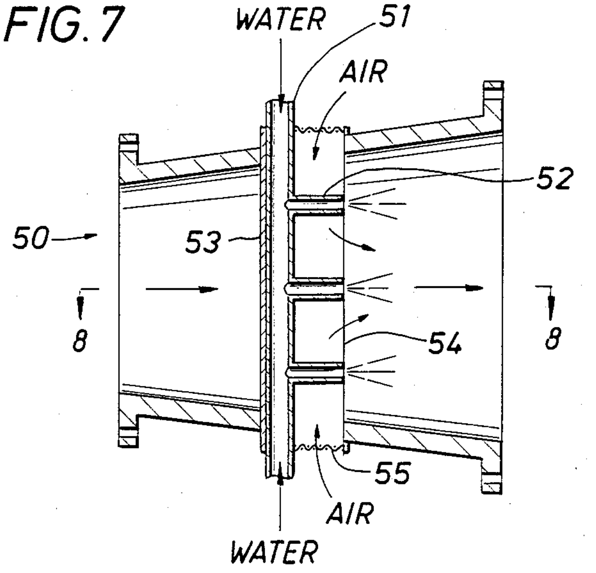
FIG. 8
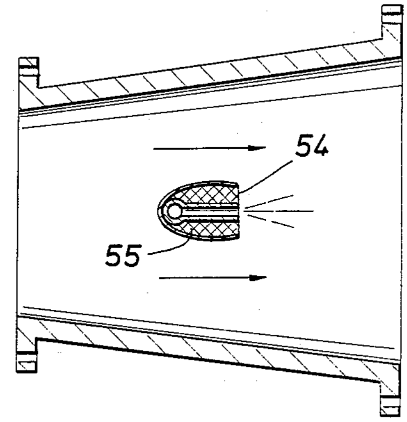
FIG. 9
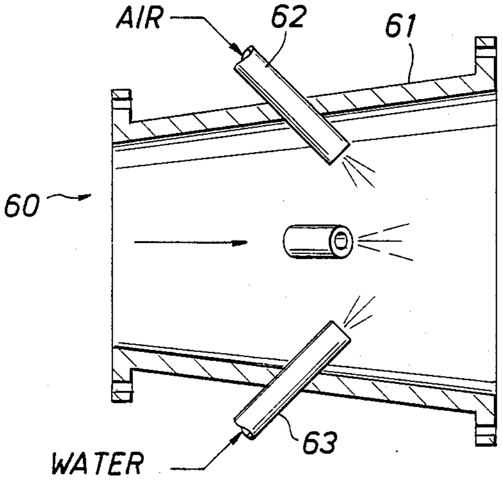
FIG. 10
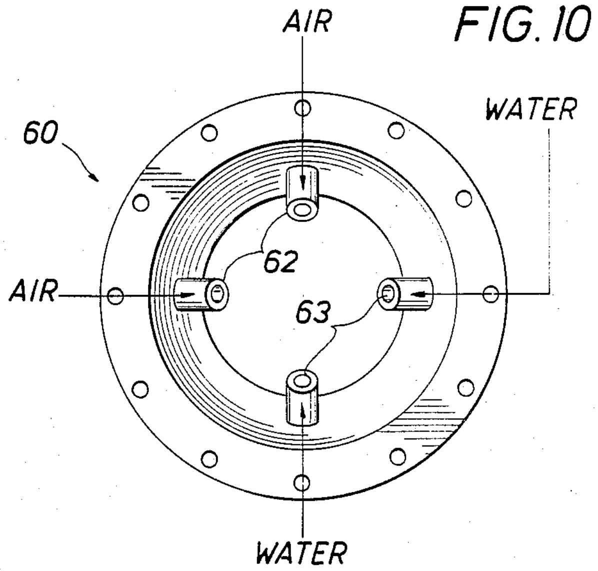
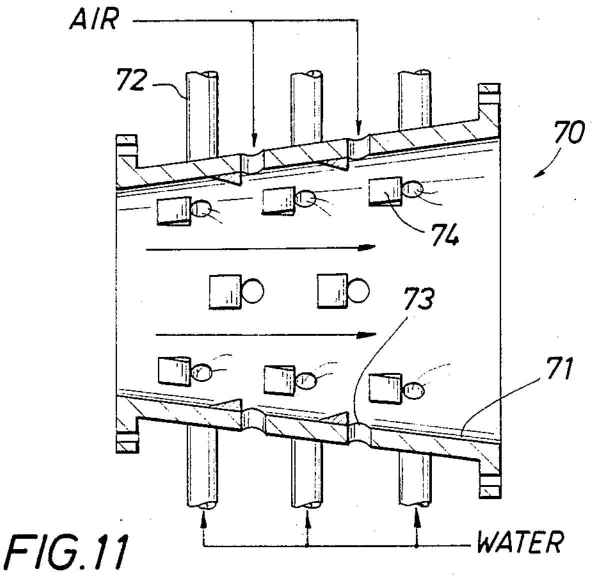
FIG. 11
FIG. 12
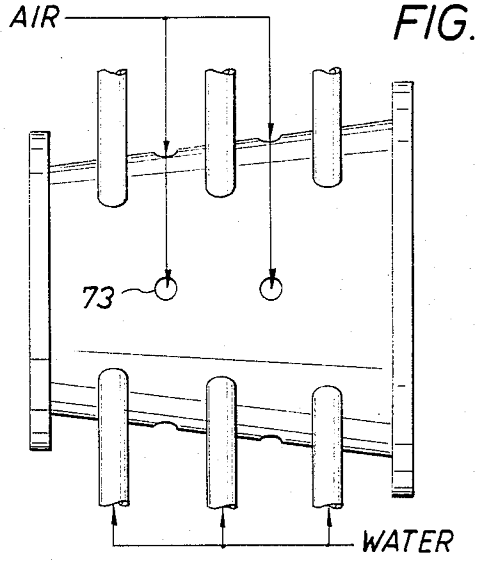

METHOD AND APPARATUS FOR STEAM FLOW VENTING INCORPORATING AIR EDUCTING MEANS

BACKGROUND OF THE DISCLOSURE

This disclosure is related to application SN 078,127 filed July 27, 1987 now U.S. Pat. No. 4,853,014 and assigned to the Assignee of the present disclosure. As set forth in that disclosure, installation of process plant equipment involves the process of directing steam through the piping of a plant for initial cleaning purposes. For a typical situation, that disclosure describes how the plant boiler is operated to make steam which is directed through various conduits and pipes of the plant and further describes how a temporary conduit is installed to route the steam so that the plant piping is cleaned. The disclosure goes on to set forth difficulties in venting the flow of steam. Many difficulties arise in the handling of the steam, particularly at the venting step after the cleaning process has been completed. There are three primary difficulties related to the steam venting, one being the noise of venting, another being the derivative sonic backpressure wave which is formed during venting, and the third is the reactive force acting on the vent line. The static backpressure wave established restricts venting so that the volume of steam passing through the vent is reduced. When this occurs, it completely changes the rate of flow in the plant piping and may regrettably reduce the cleaning action which occurs.

The foregoing disclosure is directed to various features for handling these problems including the introduction of a water spray for the purpose of cooling and decelerating the steam flow. Moreover, the prior disclosure sets forth a mode and mechanism for injecting water spray as a mist in intimate contact with and mixed intimately with the steam to thereby avoid the backpressure resulting from the sonic shock wave. In the present disclosure, it has been discovered that there are optimum rates of introduction of water and air. The water is sprayed into the steam flow which is traveling almost at sonic velocity. The present process is especially effective where the steam velocity is at least about 35% of sonic velocity to just below sonic velocity. It is ideally operated just below sonic velocity, in other words, typically in the range of 75-90% of sonic velocity. The present process involves adjusting the rate of water flow so that an optimum is achieved. Water is the ideal cooling and decelerating material. The rate of flow is increased from zero. Obviously, an axiom that more is better might well prevail. However, there is an optimum water rate. Increasing the water flow above the optimum has detrimental effects on the system. The optimum rate of water introduction occurs at when rate of water misted into the flow causes the velocity to decelerate from some maximum velocity down to about 35% of sonic velocity. If the velocity drops below that, there is the consequential probability of water droplets separating from the steam in the piping system downstream of the mist injection. Accordingly, one feature of the present disclosure is the process of optimizing the water flow so that deceleration is accomplished down to about 35% of sonic velocity but does not go much therebelow and run the risk of separating in the piping system. With excessive water addition and/or flow velocities below the optimum, the water mist will separate from the steam forming an annular film on the pipe wall. This film of water will travel at velocities less than the steam conveyed in the center of the pipe and the benefit of momentum transfer by further water addition is lost. In addition, the water film on the pipe wall has the effect of reducing the cross-sectional area available for steam flow which has the effect of increasing the system backpressure.

An important feature of the present disclosure is the added step of introducing large volumes of air along with the water mist. The air is introduced, not in fixed quantity, but at a rate that is determined by the pressure differential arising from eduction. Ideally, air is introduced at or about the region where water mist is introduced so that the two added fluids markedly cool and decelerate the steam flow, thereby resulting in the desired dissipation of the steam at venting, avoiding the formation of noise, and avoiding the formation of a backpressure sonic wave. Addition of large volumes of air into the steam at the same point of water addition results in the greater atomization of the water jet due to the fact that the water surface violently erupts as a result of the vaporization of the water. The addition of copious amounts of air reduces the vapor pressure of the water, increasing the resultant vaporization of the water and thus increases the breakup of the injected jet, the formation of a fine dispersed mist and enhances the momentum transfer from the steam to the injected fluids. This vaporization also converts thermal energy from the steam to vaporization energy, thus cooling the aggregate flow to reduce specific flow volume and therefore fluid velocity. Addition of copious amounts of air also enhances system safety since, in the event water supply is lost, the mass of air educted will be sufficient to cool and decelerate steam to avoid sonic waves and also keep reactive forces within safe limits. The air educting apparatus preferably includes an external air inlet directed into the pipe where the steam flow is located, is directed downstream so that eduction occurs, thereby introducing a variable quantity of air. Moreover, air is educted in one embodiment through a flow controlled butterfly valve which opens in proportion to the air flow to provide automatic air flow regulation. Air induction can be enhanced by use of the water mist as a momentum source. Compressed air expanding through a nozzle can also be used to enhance air induction. Blowers or fans may also be used to increase the air flow to the eductor.

The foregoing is developed in several embodiments as illustrated, various embodiments using single sets of such equipment, and alternate embodiments showing first and second sets of such equipment. One advantage of the present procedure is the incorporation of a temporary pipe which has increasing diameter so that steam flow through the piping is permitted to expand during deceleration. Such expansion involves temporary piping which incorporates a frustoconical pipe section making a transition from a smaller to a larger diameter. More than one such frustoconical section can be used as required to limit backpressure to acceptable levels while minimizing the cost of the installed temporary pipe.

While the foregoing is directed to certain features of the preferred embodiment of the present disclosure, details relating to the present procedure will be more readily understood upon a review of the below written specification in conjunction with the drawings which are appended to the present disclosure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the drawings:

FIG. 1 is a sectional view through a temporary piping system incorporated with a steam flow where the steam travels from left to right and further showing a water misting injection means and an air eduction means;

FIG. 2 is a sectional view through a frustoconical tubing section providing an enlarged flow area and further including a controllable valve for delivery of water and a valve regulated air eduction system;

Figure 4:
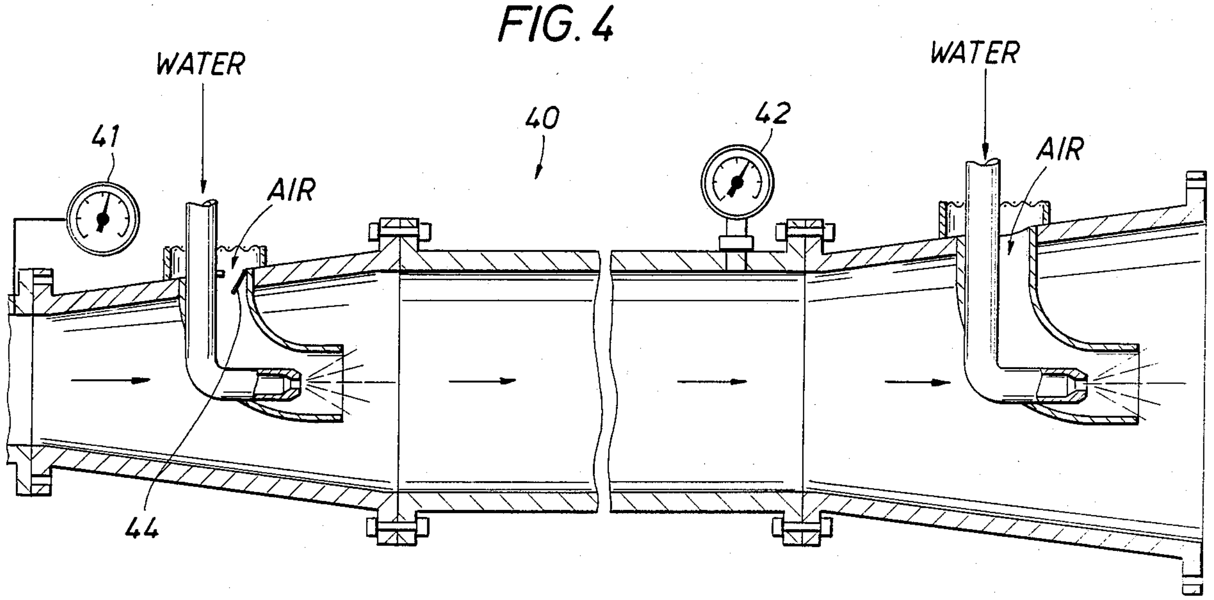
Figure 5:
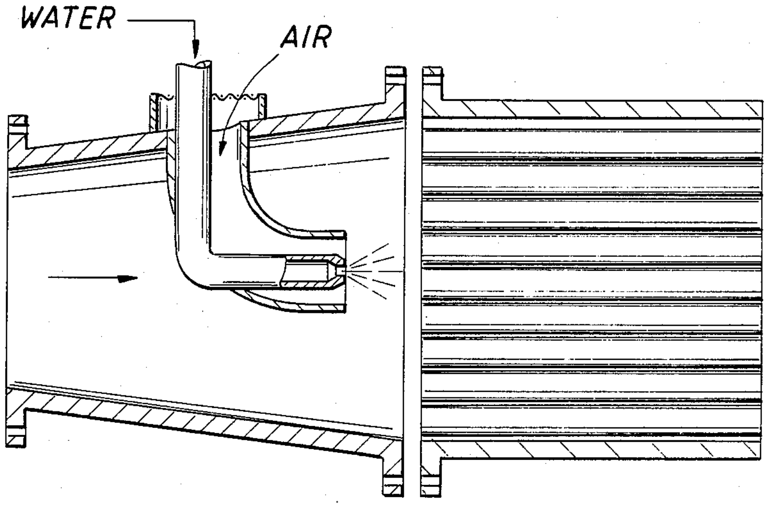
Figure 6:
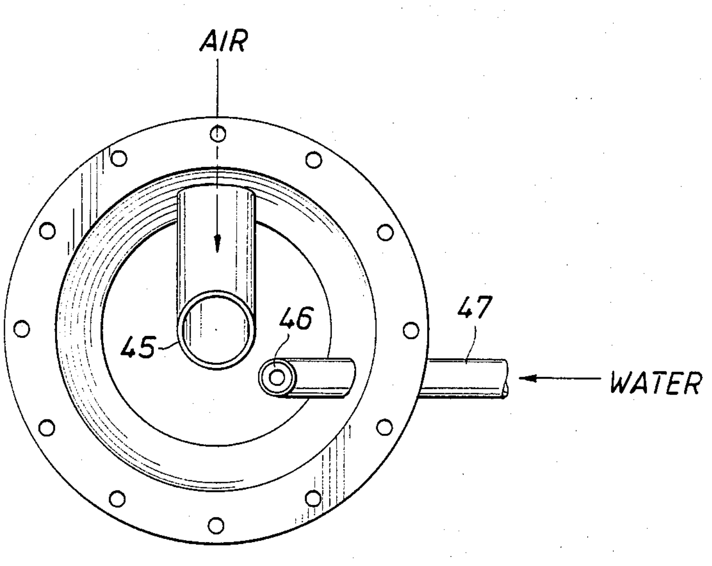

FIG. 3 of the drawings shows a temporary piping section including first and second sets of air and water introducing means which enables staged cooling and deceleration of the steam flow;

FIG. 4 is a view similar to FIG. 3 showing an alternate embodiment incorporating multiple pressure gauges to assist in controlling the rate at which air and water are introduced to the steam flow;

FIG. 5 is a sectional view through a frustoconical pipe section similar to FIG. 2 and also a set of laminar flow tubes, wherein water and air are introduced into the steam flow;

FIG. 6 is an end view through a frustoconical pipe section showing an alternate way of mounting the inlet members for introducing air and water;

FIG. 7 is a sectional view through a frustoconical pipe section showing a transverse water injection line with appropriate nozzles connected thereto and further illustrating an externally streamlined vane which has a lengthwise passage for introducing air educted into the system;

FIG. 8 is a sectional view along the line 8–8 of FIG. 7 showing details of construction of the water conduit and the streamlined vane which introduces air;

FIG. 9 is another frustoconical pipe section showing injection conduits for air and water set at an angle with respect to the axis of the pipe section;

FIG. 10 is an end view of the structure shown in FIG. 9 showing four injection conduits;

FIG. 11 shows another alternative embodiment of a frustoconical pipe section having a plurality of distributed air and water inlets wherein an upstream fillet diverts the steam flow so that eduction occurs at the various inlets; and FIG. 12 is an external view of the pipe shown in the sectional view of FIG. 11 showing water and air inlets on the exterior including means for distributing air and water.

DETAILED DESCRIPTION OF THE PREFERRED EMBODIMENTS

Attention is now directed to FIG. 1 of the drawings where the numeral 10 identifies a temporary piping section installed for directing a steam flow for venting. It is best used in a steam cleaning system of the sort described in SN 078,127 filed July 27, 1987,now U.S. Pat. No. 4,853,014. In any event, the piping 10 is described as temporary piping which is connected to serve as an outlet for steam flow generated in a system undergoing cleaning. The system which is to be cleaned routinely includes a boiler and piping which is typically permanent for the system. At the time of installation, the piping and other equipment in the steam distribution system may well have substantial quantities of internal debris and the like which is removed by steam cleaning. The present system therefore contemplates the temporary piping 10 which is connected in normal fashion to vent steam from the fixed plant installation which is undergoing cleaning. The fixed plant will therefore include a boiler which is a source of steam and piping routed by a multitude of pipes, elbows, reducers and well known fittings. The steam is directed through the piping of the plant for cleaning purposes. For illustration purposes, FIG. 1 therefore incorporates a pipe 11 which comprises a part of the piping in the plant which terminates at an opening to enable the temporary piping section 10 to be installed. Steam flow is from left to right and can be directed to atmosphere at the right hand end. It can be simply directed in a direction away from the plant so that it is delivered safely into the atmosphere.

The temporary piping section 10 is attached temporarily by means of bolts fastened on a bolt circle 12 to enable flange-to-flange connection. Moreover, the pipe section 10 incorporates a pressure gauge 13 which is upstream of the injection points as will be described. This pressure gauge reflects the pressure which is regrettably impacted by the downstream sonic wave creating backpressure. The gauge 13 is therefore used to determine whether or not backpressure is a problem. Since it is the problem so commonly found in steam venting, the gauge is very helpful to illustrate to an observer the amount of the backpressure. Alternately, backpressure can be detected by the sound intensity. It is not uncommon for the sound level within 100 feet of the vent to be as high as 120 dB in the event backpressure is formed for the steam flow creating a very noisy discharge. The present disclosure contemplates reduction of the noise level by a substantial amount, not by suppression of noise but by avoiding the conditions which create the noise in the first instance. Noise is avoided by: (1) avoiding sonic shock waves; (2) avoiding flow turbulence which would generate noise; (3) avoiding cavitation and boundary layer separations which would propagate pressure waves; and (4) avoiding large velocity gradients which would result in localized areas of high shear between high velocity and low velocity fluid at the exhaust of the system flow FIG. 1 further illustrates a water source 14 which delivers water through an inlet nozzle 15. The discharge is in the form of a spray which is sufficiently fine as to form a mist. The nozzle 15 is supported by a water pipe 16. The nozzle is ideally located approximately centerline in the steam flow so that all the water that is introduced is swept downstream. The water is introduced under pressure as will be described and is jetted into the pipe system 10 to form a spray or mist. The water is typically introduced at ambient or prevailing temperatures, but with sufficient pressure to form a spray. The spray is introduced into the flowing steam so that it will in part quickly vaporize as will be described.

The numeral 18 identifies an outlet for educted air. The outlet 18 is built on a curving, somewhat streamlined introductory pipe 19. The pipe 19 connects with an eductor inlet 20. A screen 21 is incorporated to keep large trash from entering the eductor. In general terms, the shape of the air delivery system is ideally streamlined so that disturbances in the steam flow are held to a minimum. On the other hand, it is sufficiently large to provide injection of an adequate volume of air. The air inlet at 20 is larger so that a greater volume of air can be educted into the system. It is streamlined along the flow path so that the steam is altered by the misted water and educted air. The benefit of this will be described in detail below.

The preferred method of operation in steam cleaning generates a discharge steam flow which is a superheated flow of steam perhaps as hot as 1000° F. The source pressure can be several hundred psi but pressure will drop at the flow discharge. The diameter of the flow is dependent on scale values and can be quite large depending on the size of the plant undergoing steam cleaning. In any event, quality of cleaning is determined in large part by holding the backpressure to a minimum. If the backpressure is high, the steam flow or velocity is reduced. This backpressure problem is overcome by injecting the two additional fluids, air and water in the fashion described below. The introduction of air and water into the steam flow cools the steam which is usually superheated in the practice of the method described above. The steam is cooled and decelerated. Cooling and deceleration both occur as the air and misted water diffuse into the steam flow. The heat transfer that occurs from the superheated steam into the two injected fluids results in a net reduction in steam velocity. The energy and momentum transfer from the superheated steam into the two injected fluids results in a net reduction in steam velocity. This serves as a means of reducing vent noise level on discharge from the temporary pipe 10.

FIG. 2 of the drawings shows an alternate temporary pipe used in a similar way to the structure shown in FIG. 1. In FIG. 2, the pipe 22 is a frustoconical pipe which is larger at the right hand end to accommodate the enlarged volume of the slower moving steam with the added air and water. The cross-sectional area is increased to provide a larger volume. The sectional view shows the pipe 22 terminating between flanges 23 and 24 constructed in accordance with an industry standard to enable connection with mating flanges. The expansion permits steam flow deceleration without creating additional backpressure resulting from fluid expansion. FIG. 2 further shows a valve 25 for control of the rate at which water is introduced. The valve 25 is normally operated by personnel to control the delivery of water while observing the pressure gauge 13 which is upstream of the point of injection. The valve 25 can be provided with a valve controller in a servo loop adjusted to maintain minimum pressure just upstream of the injection point. The valve 25 is incorporated to control the rate of flow of water. The relationship between the rate of flow of water and the pressure as indicated by the gauge 13 will be exemplified in detail. FIG. 2 in addition shows a conduit 26 which communicates with an open inlet 27. Air is introduced through the inlet 27 and flows through the passage 26 for eduction into the pipe 22. The rate at which air is introduced is controlled. A valve 28 is included in this passage, the valve 28 opening by rotating around a hinge. As the educted air flow increases, the valve 28 opens to a greater angle. When there is very little steam flow, the valve 28 is more or less closed. It need not close tightly because a complete seal is not required. Rather, the valve 28 preferably closes substantially but not totally so that air is available for the eduction inlet. When the steam flow is slow, the valve 28 will typically open very little, perhaps not at all. Momentum transfer from the water mist to the air will tend to induce continued air flow even at low steam velocities. In the chance that the system is shut down yet still exposed to some steam pressure, the valve 28 is arranged so that very little of the steam escapes out through the eduction port. As the flow velocity picks up, the valve 28 is then forced open as the flowing steam increases in velocity and increases the pressure differential through the eduction means, thereby introducing more and more air into the flow. The rate at which air is introduced increases as the velocity increases.

Optimum operation of the fluid introduction system should be considered. Assume for purposes of description that the valve 25 has been cut off. In that instance, the rate of water introduction is zero. The valve 25 is opened gradually. As it is opened, increasing the rate of water introduction, the fluid provides both cooling and deceleration, and increases the beneficial effect. However, the rate of water introduction can not be increased without limit. As water flow is increased, the velocity of the steam is decreased. The steam velocity, however, is not reduced below about 35% of sonic velocity. Should the velocity be reduced below that limit, the steam will be sufficiently laden with droplets that water will collect at the piping walls, thereby creating a separate set of problems. Moreover, as the water accumulates on the sidewall of the pipe downstream from the point of injection, the diffused mixing achieved on misting the water into the steam flow is lost. This degradation is undesirable because it leads to (1) increased backpressure, (2) irregular pipe cooling on the pipe circumference creating irregular stress and (3) forms large quantities of scalding water. Therefore, the rate at which water is introduced is increased, but with this limit. Water is not introduced above the rate at which steam velocity is reduced to below 35% of sonic velocity.

Understanding of the velocity lower limit is graphically assisted by FIG. 10.3 on page 510 of *The Flow of Complex Mixtures in Pipes* by Govier and Aziz, Von Norstrand Reinhold Company. This graph of superfacial gas velocity versus superfacial water velocity shows how a two phase mixture changes flow patterns dependent on velocity and relative proportions. This relates to steam velocity.

Air is introduced through the eduction system shown in FIG. 2 in proportion to velocity. If the steam velocity is increased from 35% to 70% of sonic velocity, the air eduction rate increases proportionately with it. The commingling of air and water diffuse into the piping system results in a reduction in steam flow velocity to enable easy discharge without building the backpressure wave constricting discharge through the vent. Moreover, the noise level is markedly reduced from the excessive noise levels derived from the backpressure wave formed at the nozzle or vent. Since the backpressure wave is not formed, the noise level is substantially quieter, and noise suppression techniques are not then needed. Due to the lower velocities after the water and air addition, the turbulence of the existing gas mixture is reduced. Reduction in turbulence also is aided by the higher viscosity of the air. Lower turbulence and velocity avoid noise associated with cavitation.

Attention is now directed to FIG. 3 of the drawings where a connector pipe 30 is identified for connection from the piping system to vent steam flow originating with a boiler for cleaning purposes. The system shown at FIG. 3 is different from the system shown in FIG. 1. In similar fashion, it incorporates a temporary connecting pipe 30. The steam flow is introduced from left to right. This embodiment 30, however, differs in several details. First of all, the pipe section 31 enlarges along its length and has a frustoconical shape. A first set of injectors is located at that point. A water injector through a suitable set of nozzles 32 is included. This includes a header pipe 33 for delivery of the water. The water is sprayed or misted downstream. In addition, an air inlet conduit 34 is installed for educting air, the air being drawn in as a result of the steam flow. Air may also be injected in large volumes into the system under pressure.

The numeral 35 identifies a straight pipe section which is larger than the inlet at the far left, the larger size permitting expansion of the steam as it is decelerated. The section 35 connects with another enlarged frustoconical section 36 which increases in diameter at the far right. Upstream pressure of the outlet side is measured by a pressure gauge 37 which forms an appropriate pressure indication. A nozzle 38 is suspended in a centerline location to introduce water in the form of a spray which is sufficiently fine that the water is a mist which flows away with the steam flow. There is also an air eduction means 39 which is substantially similar to that shown in FIGS. 1 and 2. The embodiment 30 has two stages of fluid injection. The first stage delivers water and air almost simultaneously into the flowing steam. The injected water droplets evaporate to cool the air/steam mixture. This reduces specific volume of the mixture further reducing velocity. The presence of dense water droplets also allows expansion of annular mist fluid in the conduit expansion without generation of excessive turbulence or sonic waves which generate noise. Cavitation (another common noise source) is prevented by establishing a condition where voids generated by high steam velocities are filled by evaporation of the water mist droplets. The evaporation is enhanced by air addition which reduces the equilibrium boiling point. As the fluids are introduced, the steam is decelerated and expands in the greater cross-sectional area permitted by the frustoconical pipe section 31. This is repeated with the second set of injection equipment.

The two sets of injectors are identical in the sense that they inject misted water and permit eduction of substantial quantities of air. The same result is accomplished at both locations. It is desirable in contrast with a single mechanism introducing air and water because the staggered or staged injection and eduction permits partial reduction in the steam flow velocity. As the velocity is reduced in transit, momentum of the steam is reduced in a fashion to dissipate the energy of the steam flow. The staggered introduction of air and water at the second set of nozzles provided for introduction at the right hand of FIG. 3 permits another reduction in fluid velocity. This is warranted as the mixture velocity tends to accelerate as the mixture moves from left to right in pipe section 35. This acceleration is the result of the expansion of the gases as the pressure is reduced. Typically velocity at the entrance of section 35 is designed to be about 35% of sonic velocity and the length of section 35 before a second expansion is determined by diameter and pressure drop such that the velocity at the right end of section 35 does not normally exceed about 65% of sonic velocity. When the flow is markedly reduced in velocity, the interaction of the flow with the confining pipe avoids the possibility that a standing wave might be formed which artificially raises the backpressure thereby resulting in increased noise on discharge through the vent. It will be understood that the first and second sets of nozzles shown in FIG. 3 have accomplished a controlled reduction of steam flow velocity.

The pressure gauge 37 shown in FIG. 3 is used in the same fashion as that shown in FIG. 1. The goal in its use is to determine the optimum pressures and flow rates for obtaining steam flow deceleration.

FIG. 4 of the drawings shows an embodiment 40 similar to FIG. 3 differing in two rather noteworthy details. First of all, FIG. 4 shows two pressure gauges at 41 and 42. The two pressure gauges are incorporated to obtain first and second pressure readings as the steam flow is decelerated. They provide indications indicative of backpressure which is partly dependent on steam flow deceleration. Recall the fundamental premise that the steam jet discharged through a vent or outlet forms a standing wave which increases backpressure. Backpressure is observed by the readings at the gauges 41 and 42. That is, should there be a backpressure wave formed in the apparatus shown in FIG. 4, the gauges will read pressure levels indicative of the formation of such a backpressure wave. They are also included to enable fine tuning of the flows introduced into the first and second sets of injectors shown in FIG. 4. The piping expands to a larger cross-section. Moreover, there is additional velocity reduction by the additional injection of water through the second set of injectors. Again, both sets incorporate air eductor systems. The two air eductor systems are different in another regard. In FIG. 4, one of the air eductors incorporates a flap valve 44. The valve 44 is included for closure in the event that steam flow is stopped. This prevents the escape of steam through the air eductor inlet. It functions as a check valve as shown in FIG. 4.

The amount of air educted and water mist sprayed into the exhausting steam is determined by the quantity and velocity of steam entering the exhaust device. The ratio of total max exhausting from the system to that entering is determined by means of a momentum balance of $(MV)_{in}=(MV)_{out}$. The increase in pipe diameter required is determined by using the outlet velocity and the volumetric flow of the exhausting gas-liquid mixture to determine the required pipe cross-sectional area.

FIG. 5 of the drawings shows the single transition conduit or pipe which is frustoconical in shape and which is used at two locations in FIG. 4. In FIG. 4, the two frustoconical pipe sections differ in scale. FIG. 5 shows a simplified version of such a frustoconical pipe section. It is simplified in the sense that the pressure gauges and the appropriate mountings for the pressure gauges have been omitted. The embodiment in FIG. 5 depicts the relative straight forward simplicity of the present apparatus wherein water is delivered into the steam flow as a mist, and air is educted into the steam flow, the two fluids accomplishing the purposes described above. The transition pipe is connected directly (or by a straight pipe) to an outlet formed of a nest of tubes. The several tubes reduce turbulence and provide less turbulent flow on exhausting to atmosphere. It is possible to direct the flow vertically provided the elbow is some distance upstream. By further contrast, FIG. 6 shows a separated arrangement of the two fluid inlets. In FIG. 6, the air inlet is identified at 45. It is again a curving pipe which is introduced from the exterior to educt air into the steam flow. Water is introduced through a spray nozzle or tip 46. This is located at a different location but approximately even with the air inlet. In other words, the two fluids are introduced at approximately the same position along the length of the equipment. The water nozzle is supported on a water pipe 47 which extends to the side and is connected from an alternate direction. The air and water conduits shown in FIGS. 1–5 are somewhat concentric, at least to the extent that one of the two pipes encloses the other. This is not so in FIG. 6.

FIG. 7 shows an alternate embodiment identified generally at 50 which is constructed in a frustoconical pipe section. This embodiment includes a pipe 51 for delivery of water. It is delivered downstream through a series of parallel downstream directed branches 52 which terminate in water outlets or nozzles as required. They introduce water across the width of the frustoconical pipe section. Moreover, the water is delivered in the form of a mist or spray which permits the water droplets to be diffused as a mist, to serve as a cooling and decelerating fluid for the fluid flow along the pipe section. There is a generally U-shaped cowling 53 which is positioned as a strut or brace across the pipe. It encloses the water pipe 51. It has a streamlined edge facing upstream. It has an open side at 54 and an inlet covered by screen wire 55. The screen wire shown in FIG. 7 is included to filter trash and to prevent its entry into the steam flow. Air is educted in through the mesh 55 and out through the open side at 54. This air flow, again, is educted into the steam flow and is mixed with steam. The amount of air delivered is dependent on the velocity of the steam and other scale factors.

FIG. 9 of the drawings shows another embodiment at 60. The embodiment 60 is constructed with a frustoconical pipe section 61. An angled air nozzle 62 is included. A similar angled nozzle 63 is likewise included but it is connected with a water source. It preferably terminates at a spray tip which delivers the water in the form of a mist. The embodiment 60 is better shown in FIG. 9 of the drawings. There, the air inlets are shown at 62, and the water inlets are shown at 63. The several inlets are spaced approximately at equal distances of circumference around the structure and are spaced even with one another along the length of the frustoconical pipe 61. In general terms, they deliver air and water mixed as a fluid for the flow. FIG. 10 is an end view of the structure shown in FIG. 9 and depicts spacing of multiple air and water inlets which are arranged around the circumference, there being four in this embodiment. The number can be varied to include more inlets for the purpose of introducing air and water at a common location. The water is normally supplied under pressure from a water supply while the air is educted into the embodiment 60.

FIG. 11 of the drawings illustrates another embodiment identified generally at 70 which is again a frustoconical pipe section 71 terminating at appropriate end located flanges for connection, and illustrates a number of water inlet lines 72 which are similar in construction and which introduce water. The water is introduced into the steam flow and is picked up as a mist in the steam. In addition, there are a number of ports 73 where air is educted into the steam flow. All the ports for introduction of air and water are located downstream of a triangular fillet or gusset 74. The gusset is installed within the pipe section 71 with the narrow end upstream and the larger end immediately adjacent to the port where air or water is introduced. It is constructed so that the steam flow is diverted slightly above or away from the port. This small angular deflection of the steam flow creates a type of suction which increases the eduction action drawing air into the pipe 71. This sweeps the injected air and water in with greater pressure differential drive in view of the fact that the gusset reduces local pressure in that region. FIG. 12 shows the same apparatus on the exterior and shows how air and water inlets are located fully around the structure on all sides.

In summary, the foregoing describes a system for disposing of a steam flow traveling at velocities up to sonic velocities where the steam is cooled and decelerated by the optimum flow rate of cooling water introduced as a mist into the steam, and also describes educting air in a controlled flow rate into the steam flow. Because the air and water are introduced into the steam flow in this fashion, there is a quenching effect which reduces the volume of steam from superheated steam down to a smaller volume, reduces the velocity of the steam, and accomplishes all of this without creating a backpressure sonic wave. This does not merely reduce noise but rather avoids the creation of noise in the first instance. For these reasons, the present system is able to enhance operation upstream of the vent so that upstream cleaning is accomplished in greater measure.

TYPICAL APPLICATION OF THE PREFERRED EMBODIMENT

The present disclosure will become more understandable on the consideration of a specific example. Assume for the purposes of description that the system of FIG. 4 is installed so that air and water are injected at the two illustrated locations along a vent or exhaust line, and further assume that the line terminates at a set of small, individual parallel pipes exemplified in FIG. 5. For purposes of this example, the physical structure will be described first, this structure being markedly reduced in cost and complexity in light of the reaction forces that otherwise arise from fluid discharge under high pressure. The steam that is used to clean the piping system of a plant is delivered through an outlet line. For the present example, assume that the exhaust requires handling of 216,000 pounds per hour of steam at 1,000° F. and is delivered through an 18", schedule 120 pipe. The system shown in FIG. 4 deploys an exhaust or vent pipe which is about 110 feet in length from the 18" line. Superheated steam is delivered through the 24"pipe into the frustoconical pipe section which expands to about 28". If delivered at 1,000° F. as superheated steam and the flow is 216,000 pounds per hour, pressure at the 18" line is 27 psia and the velocity is about 2,055 feet per second. Where the air and water are introduced through the frustoconical point of injection, the temperature can be dropped to about 213° F. and the velocity to about 626 feet per second in a 24" pipe. Pressure is lowered slightly to about 19 psia at the end of the frustoconical pipe section. To accomplish this, one must introduce about 108,000 pounds per hour of air and 284,400 pounds per hour of water vapor. This represents about 569 gallons of water per minute and 23,940 SCFM of air. The 24" pipe section is approximately 110' in length. As commingling of the introduced air and water vapor occurs, the pressure will typically drop and the velocity will typically increase. At the end of the 110" pipe section and immediately prior to introduction into the second frustoconical pipe section, the temperature remains steady at about 213° F., velocity is about 743 feet per second and pressure is reduced to approximately 16 psia.

Additional air and water are introduced at the second frustoconical pipe section exemplified in FIG. 4. Water is introduced at the rate of 28 gpm and air at the rate of 259,350 SCFM. The air flow is now approximately 1,278,000 pounds per hour and the water vapor flow is approximately 515,000 pounds per hour. The temperature is now reduced from about 213° F. to about 148° F. Discharge pressure is approximately 14.7 psia. The discharge from the frustoconical pipe section is into a short pipe of about 84" diameter with a wall thickness of about 0.5" and which terminates into a nest of 4" tubes which are 24" in length. Approximately 250 such tubes are required. They provide flow straightening, yielding a less turbulent flow output. One important benefit is reduction and distribution of the reactive force which otherwise occurs with nozzle discharge. The momentum exchange of the superheated steam flow engaged by the introduced air and water mist changes entirely the loading which occurs in the pipe system. In other circumstances, the discharge pipe would be quite large, quite heavy and anchored by extraordinary means. Such a system is not required in the present apparatus. Noise is not merely abated, but the creation of noise is avoided. Noise simply is not created and therefore noise levels are markedly different. Since noise is not created, there is no need for extraordinary efforts to muffle the noise or to otherwise overcome the difficulties arising from this discharge. The foregoing calculations provide theoretical estimates of pressures, flow rates and the like. If desired, the rate of air and water introduction can be made adjustable so that flow rate manipulation is permitted.

Many benefits arise from the foregoing but, in particular, the discharge pipe need not be anchored which has been an expensive undertaking heretofore to provide heavy duty anchoring. The reactive forces have in the past posed a tremendous problem. For instance, discharge through an 18" pipe at 27 psia involves a substantial reactive force. That reactive force however is dissipated in the exchange of momentum from the high velocity superheated steam into the air and water mist which are introduced into the flow. With cooling, the steam contracts while slowing would ordinarily require a larger diameter pipe. While these factors counterbalance one another, momentum is exchanged from the high velocity steam into the injected air and water. Because of this, the steam discharge pipe exemplified in FIG. 4 can be made of reduced gauge metal because it is not required to handle the same reactive forces which would otherwise be encountered. Again, it is important to note that a standing pressure wave creating system backpressure is not created, and hence the cleaning process involved with the cavitation and flow to the steam outlet pipe continues in the intended fashion.

In the present disclosure, air movement into the steam flow is primarily by aspiration. However, when the steam velocity is nil (i.e., at start up), the air flow by aspiration is nil. At this time, it might be helpful to place a fan in the air line to force air into the system. Another reason to enhance air flow with a fan is the resultant reduction in air pipe size. For instance, the air line 26 in FIG. 2 can be reduced in size and cost if a fan is used to boost air velocity. This is very helpful at slow steam velocities. At maximum steam velocities, the air flow rate will be sufficient that the fan will not be needed.

While the foregoing is directed to the preferred embodiment, the scope thereof is determined by the claims which follow.

What is claimed is:

1. A method of venting a high velocity steam flow wherein the steam flow has sufficient velocity to develop a sonic wave causing steam flow backpressure and creating noise with venting, the method comprising the steps of:

(a) venting a steam flow at a velocity in the range of at least about 35% to a maximum velocity less than sonic velocity through a vent;

(b) spraying a cooling and decelerating fluid into the steam flow upstream of the vent; and (c) adjusting the rate at which cooling and decelerating fluid sprayed into the steam flow wherein the fluid rate is increased to increase cooling and deceleration while not increasing the fluid such that cooled steam forms droplets collecting upstream of the vent.

2. The method of claim 1 including the step of educting air into the steam flow jointly with the step of spraying the fluid into the steam flow.

3. The method of claim 1 including the step of educting air into the steam flow ratably dependent on the steam flow velocity.

4. The method of claim 1 including the step of educting air into the steam flow through a valve means more open at high steam velocity and more closed at low stream velocity.

5. The method of claim 4 wherein the step of educting air into the steam flow occurs at a location common with the location for spraying the cooling and decelerating fluid into the steam flow.

6. The method of claim 5 wherein the step of introducing the cooling and decelerating fluid occurs from multiple entry points around the circumference of a temporary piping, and including the step of educting air into the temporary piping approximately at the same location along the piping.

7. The method of claim 5 wherein the cooling fluid is misted water and misted water is injected at two spaced locations along a temporary piping prior to venting.

8. The method of claim 7 wherein the steam velocity is lowered to not less than about 35% of sonic velocity.

9. The method of claim 7 wherein the steam velocity is lowered to not less than the velocity causing water droplets to condense or collect on the wall of the temporary piping.

10. An exhaust apparatus for venting high velocity steam, such apparatus connected to at least one outlet of a permanent conduit system for transporting steam from a boiler to at least one remote location, such boiler being capable of generating sufficient pressure for development of a sonic pressure wave at one or more of the outlets of the permanent conduit system, and such steam passing through the permanent conduit system at velocities near sonic velocity to cause cavitation at the internal wall surfaces of such conduit system for the cleaning and removal of rust, millscale, debris and other objects from the conduit system comprising:

(a) temporary piping connected to and in open communication with at least one of said outlets of said permanent conduit system to allow passage of said steam from said boiler, through said conduit system and through said temporary piping;

(b) first fluid injection means for injecting a cooling and decelerating fluid into said steam as steam passes through said temporary piping;

(c) first expander means connected to and in open communication with said temporary piping to allow passage of steam passing from said temporary piping through said first expander means; and (d) eductor means for educting at least one fluid into said steam as steam is vented.

11. The apparatus of claim 10 wherein said first fluid injection means includes:

(a) a source of pressurized water;

(b) at least one water injector in said temporary piping for injecting water into said steam; (c) a first line connecting said source of pressurized water to said injector; and (d) a valve to regulate the flow of water from said pressurized source through said injector.

12. The apparatus of claim 11 wherein said eductor means further includes:

(a) a source of air;

(b) at least one air injector in said temporary piping for injecting air into said steam;

(c) a second line connecting said source of air to said air injector; and (d) valve means for regulating the flow of air from said source through said air injector.

13. The apparatus of claim 12 including a second fluid injection means further includes:

(a) a source of pressurized fluid;

(b) at least one fluid injector in said temporary piping for injecting pressurized fluid into said steam;

(c) a line connecting said source of pressurized fluid to said injector; and (d) means for valve regulating the flow of fluid from said pressurized fluid source through said injector.

14. The apparatus of claim 13 including a second separate eductor means which includes:

(a) an air inlet;

(b) at least one air injector in said temporary piping for injecting air into said steam;

(c) a first line connecting said air inlet to said air injector; and (d) valve means for regulating the flow of air from said air inlet to through said air injector.

15. The apparatus of claim 10 wherein said eductor means includes at least one aperture opening into the steam flow to allow ambient air to flow freely from the surrounding environment into said temporary piping.

16. The apparatus of claim 15 wherein an elbow extends from said aperture into said piping and said elbow is in open communication with said aperture to allow ambient air to flow freely from the surrounding environment through said aperture, through said elbow and into said steam flowing therepast.

17. The apparatus of claim 16 further including a screen positioned over the aperture of said eductor means to prevent foreign matter from being inadvertently sucked into eductor means with ambient air.

18. The apparatus of claim 10 wherein said first expander means is serially connected with said piping.

19. The apparatus of claim 18 wherein said expander means comprises a frustoconical pipe section.

20. In an exhaust system venting high velocity steam formed by a boiler connected with a set of permanent conduits for handling such steam, the boiler being capable of generating sufficient pressure for development of a sonic wave at one or more outlets of the permanent conduit system through which steam from the boiler flows and wherein the velocity of the steam flow is sufficient to cause cavitation at internal wall surfaces of the permanent conduit system for cleaning and removal of unwanted materials in the conduit system, an apparatus incorporating temporary piping connected to the permanent conduit system for venting the high velocity steam flow wherein the apparatus incorporates means for educting air into the steam flow.

21. An exhaust apparatus for venting high velocity steam, comprising:

(a) piping connected to and in open communication with an outlet from a steam source to allow passage of steam through said vent piping;

(b) fluid injection means for injecting a cooling and decelerating fluid into steam flow as steam passes through said piping;

(c) first expander means connected to and in open communication with said piping to allow passage of steam passing from said piping through said first expander means; and (d) air injection means for adding air into steam prior to venting of the steam.

* * * * *